Oct. 20, 1931.　　　O. B. EVANS　　　1,828,461
MANUFACTURE OF WATER GAS
Filed Jan. 24, 1924　　2 Sheets-Sheet 1

WITNESS:
Rob R Mitchel.

INVENTOR
Owen B. Evans
BY
Augustus B. Stoughton
ATTORNEY

Oct. 20, 1931.    O. B. EVANS    1,828,461
MANUFACTURE OF WATER GAS
Filed Jan. 24, 1924    2 Sheets-Sheet 2
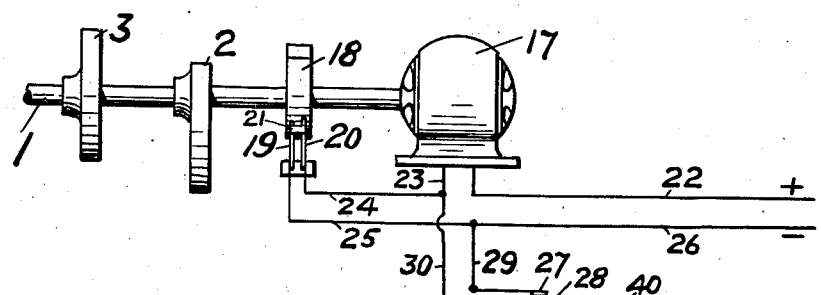
FIG. 4.
FIG. 6.
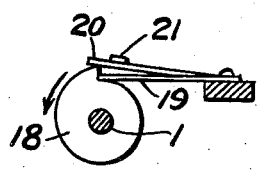
FIG. 5.
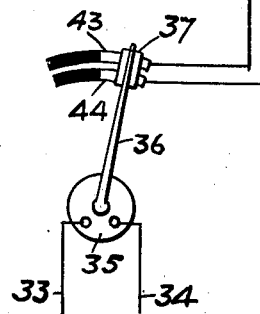
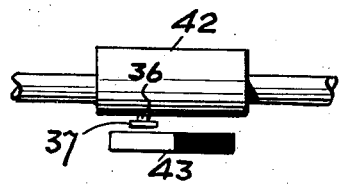
FIG. 7.    FIG. 8.
WITNESS:
INVENTOR
Owen B. Evans
BY
Augustus B. Stoughton.
ATTORNEY.

Patented Oct. 20, 1931

1,828,461

UNITED STATES PATENT OFFICE

OWEN B. EVANS, OF PHILADELPHIA, PENNSYLVANIA, ASSIGNOR TO THE U. G. I. CONTRACTING COMPANY, OF PHILADELPHIA, PENNSYLVANIA, A CORPORATION OF DELAWARE

MANUFACTURE OF WATER GAS

Application filed January 24, 1924. Serial No. 688,209.

In the manufacture of water gas the changing condition of the fire or fuel bed as well as other things, for example varying blast pressure and rate of oil supply, requires regulation of the introduction of gas making fluids, air and steam, in order to provide the proper cyclic temperature for the production of the best results in the gas making operation. Hitherto this has been attempted, either manually or automatically, by arbitrarily increasing or diminishing the duration of the blow, or air introducing step, or of the run, or steam introducing step, in such a way that the repetition of the changed step or the average of the repetition of a number of changed steps would bring about in time approximately the required cyclic temperature.

According to my invention a predetermined final temperature is produced at each of certain of the steps by terminating each such step independently of preceding and succeeding like steps when the reaction of its gas making fluid has produced the predetermined temperature. In other words, according to my invention each individual step, run or blow, is varied in length and terminated when the predetermined temperature has been reached, in contra-distinction to the old practice of seeking to attain the predetermined cyclic temperature by the average of the repetition of a number of adjusted steps, runs or blows, which succeeding each other were intended in time to bring about the required reaction for producing the predetermined temperature but which imperfectly and at best approximately accomplished that end, and during temporary departures from the correct cyclic temperature waste of gas making materials and poor quality of gas resulted.

The objects of the present invention are to secure better temperature control than was heretofore obtained, to avoid waste of gas making materials, to improve the quality of gas, and to provide means for practicing the method above outlined.

In further describing the invention reference will be made to the accompanying drawings forming part hereof and in which Figure 1 is a view largely diagrammatic, showing in elevation apparatus embodying features of the invention.

Fig. 4 is a view illustrating principally in elevation limit stop mechanism for the automatic control and thermally responsive provisions for starting the automatic control.

Figs. 5 and 6 are sectional elevations and top or plan views of limit stop mechanism, and Figs. 7 and 8 are sectional elevation and end views of thermally responsive starting provisions.

Figure 1:
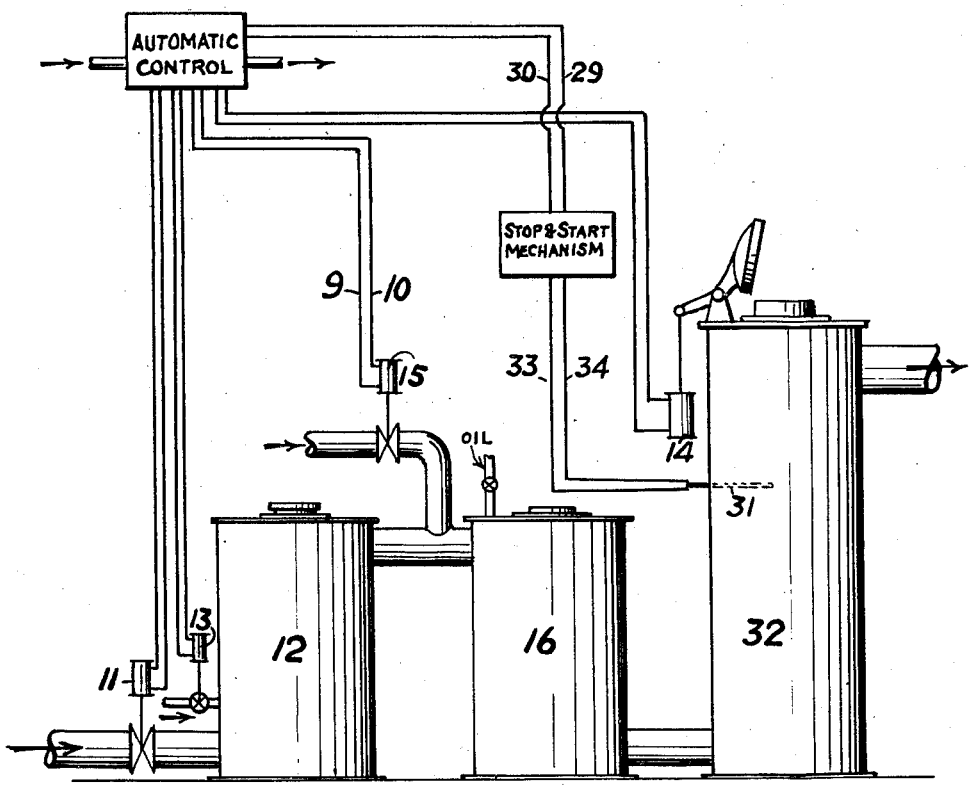

The automatic control selected for illustration so far as my invention goes is selected from among other automatic control mechanism for the sake of description only. 1 is a cam shaft provided with cams 2, 3, 4 and 5, the number not being material, and each of these cams operates a pilot valve 6, which controls the admission by way of 7 and exhaust by way of 8 of liquid under pressure to valve operating pistons by way of connections 9 and 10. Of the valve operating pistons, 11 controls the air blast to the generator 12; 13 controls the steam admission to the water gas generator 12, the steam reacting with the incandescent fuel bed in the generator to generate water gas; 14 controls the stack valve; and 15 controls the air admission to the carbureter 16. There is also a valved conduit for the admission of oil to the carbureter. The result of revolving the shaft 1 is to fix or position the valves for making an air blow during one part of the revolution of the shaft and for making a steam run during the other part of the revolution of the shaft. The shaft 1 is typical of means for effecting automatic control. The motor 17 turns the shaft 1. There is a limit stop shown which consists of a cam 18 upon which ride contacts 19 and 20, of which the former is shorter and of which the latter is provided with a bridge 21. When the ends of the spring fingers or contacts are riding on the cam, the motor circuit is complete by the path 22, 23, 24, 20, 21, 19, 25 and 26. When the short finger 19 drops into the position shown in Fig. 5 by the revolution of the cam 18, the motor circuit is broken and the shaft 1 comes to rest, and this it does during a blow or run provided that the circuit is interrupted at the contacts 27 and 28, connected by conductors 29 and 30, as shown, so that the contacts 27 and 28 are in parallel relation with the contacts 19 and 26 and with the motor. If the circuit is closed at 27 and 28 the motor does not stop. The circuit is controlled at 27 and 28 in response to temperature in the apparatus which of course is affected by the condition of the fuel bed in the water gas generator. 31 is a thermally responsive device shown as a thermo-couple arranged to be acted upon by the heat of the set and in the present instance located in the interior of the superheater 32. The circuit 33 and 34 of the pyrometer 31 includes a galvanometer 35 of which the needle 36 is shown as provided with a contact 37. The movement of the needle or arm 36 is availed of to control the contacts 27 and 28, and this it does through the relay circuit 38, 39, which includes a source of current 40 and a solenoid 41. 42 is a rotating cam driven from some source not shown and it serves at very short intervals to press the contact 37 on to the contacts 43 and 44, of which parts are connected with the conductors 38 and 39 and of which parts are insulated. The purpose of the cam 42 is to afford the arm 36 freedom for movement while at the same time insuring proper closing of the relay circuit.

Figure 2:
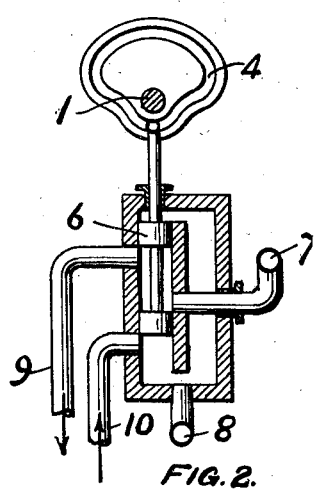
Fig. 2 is a vertical sectional view drawn to an enlarged scale and illustrating parts of the automatic control mechanism selected for illustration in the accompanying drawings.
Figure 3:
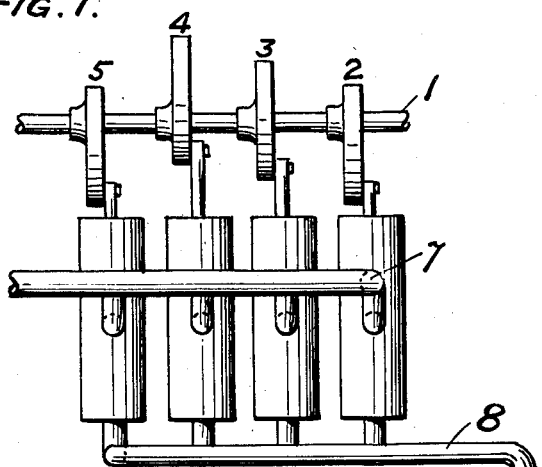
Fig. 3 is a side elevation of the mechanism shown in Fig. 2.

In use, the shaft 1 is rotated by the motor 17 for one revolution at which the air blow, or, if preferred, the steam run, is about to be completed and the limit stop comes into play and stops the shaft 1. It is a characteristic feature of the invention that the control mechanism is stopped by the temperature responsive provisions to prolong individual air blows and steam runs, or is not so stopped, in response to the temperature produced at each individual step. If the circuit is broken at 27 and 28, the blow, or run, as the case may be, continues until the temperature is sufficient to swing the galvanometer needle 36 into such a position that when it is depressed by the cam 42, it will make electrical contact between 43 and 44. The closing of this circuit 38, 39, 43, 37, 44, actuates the solenoid 41 and makes contact between 27 and 28 thereby starting the motor 17 which turns the shaft 1 and ends the blow or run as the case may be. But if the circuit is not broken at 27 and 28, the motor continues to turn the shaft 1 ending the blow or run, and starting the next step in the gas making process. The condition of the circuit 27, 28, depends upon the position of the contact 37, and this being governed by the thermally responsive device 31 depends on the temperature of the set. In the manner described the air blow or run according to which is being regulated is continued individually until the predetermined temperature has been reached. The regulation therefore is such that the predetermined temperature is reached by the continuation of each individual blow or run, as distinguished from attempting to reach it by the result of a number of repetitions of blows or runs, the duration of which has been adjusted with respect to the average. In Fig. 1 the representation marked automatic control may be considered to include the mechanism shown in Figs. 2 and 3, and the mechanism shown in Figs. 5 and 6 and the motor 17 or their equivalents, and the representation marked stop and start mechanism in Fig. 1 may be understood to include the contacts 27, 28, the relay circuit, when present, and the galvanometer 35 or their equivalents. In the old art the mean temperatures of succeeding cycles, steam run and air blow, while on the average in consonance with the predetermined cyclic temperature, were nevertheless in many, in fact most, of the individual cycles higher or lower than the predetermined cyclic temperature and in either of those cases there was waste and poor quality of gas, but from the preceding description of my invention it is evident that the predetermined cyclic temperature is attained at each and every cycle, run or blow, so that such waste is avoided and the quality of the gas is improved.

As a specific example of temperatures which have been found satisfactory in a certain type of carburetted water gas apparatus operating on a particular grade of coal the following results are given: Temperature at the base of the superheater at the end of the air blow 1450° F. The temperature of the base of the superheater at the end of the steam run 1200° F.

The temperatures at the base of the carbureter are approximately the same in each instance as those in the base of the superheater.

The temperature in the generator fuel bed at the end of the air blow 2800° F. The temperature in the generator fuel bed at the end of the steam run 1800° F.

As an example of the length of the cycle and duration of the steps in a 5 minute cycle, the air blow is normally about 1½ minutes and the steam run about 3½ minutes. When the set is operating normally under the automatic control, the length of the blow might be varied as much as 15 seconds, that is from 1¼ minutes to 1¾ minutes. If the amount of oil used by the set is varied frequently, as it may be, especially when the set is used in conjunction with other supplies of gas, the length of blow might be varied somewhat more than this.

It is to be understood that these temperatures depend upon a vast number of conditions and factors and will be dictated by experience, engineering skill and practice. Some factors upon which these temperatures will depend are the type of coal, the character of the apparatus employed and the depth of the fuel bed.

It will be obvious to those skilled in the art that modifications may be made in details of construction and of procedure without departing from the spirit of the invention which is not limited as to those matters or otherwise than as the prior art and the appended claim may require.

I claim:

A method of making carburetted water gas in a water gas set including a water gas generator, a carburetter, and a superheater, which comprises; air blasting a solid fuel bed in the generator until a predetermined temperature is attained in the superheater, automatically terminating the air blasting when the predetermined temperature in the superheater is attained, then running steam through the heated fuel bed and carburetting the generated water gas until a predetermined temperature in the superheater is attained, and then automatically terminating the steam run when the predetermined temperature is attained.

OWEN B. EVANS.